Sept. 12, 1967 E. E. LINTZ 3,340,644
FISHING FLOAT
Filed Sept. 27, 1965 2 Sheets-Sheet 1
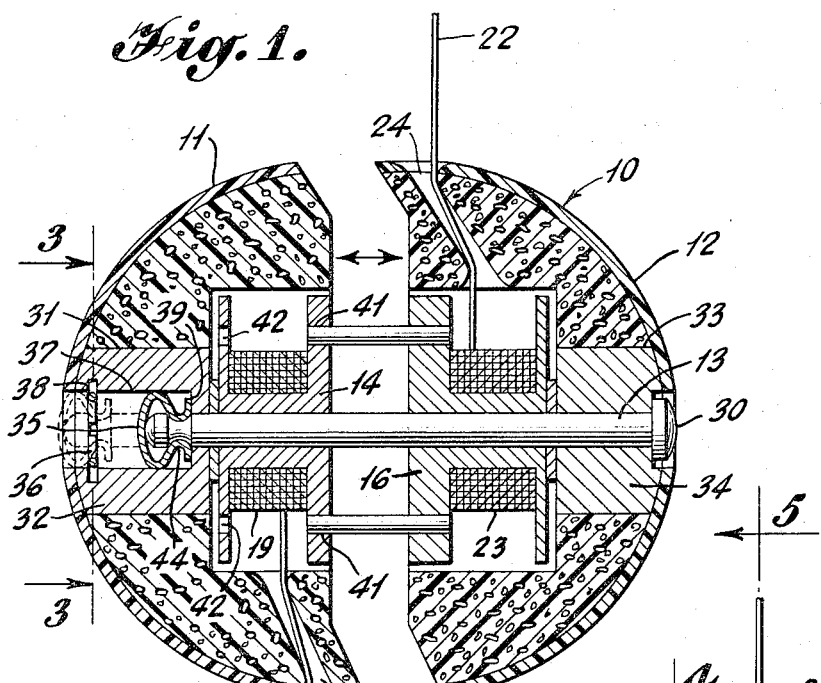
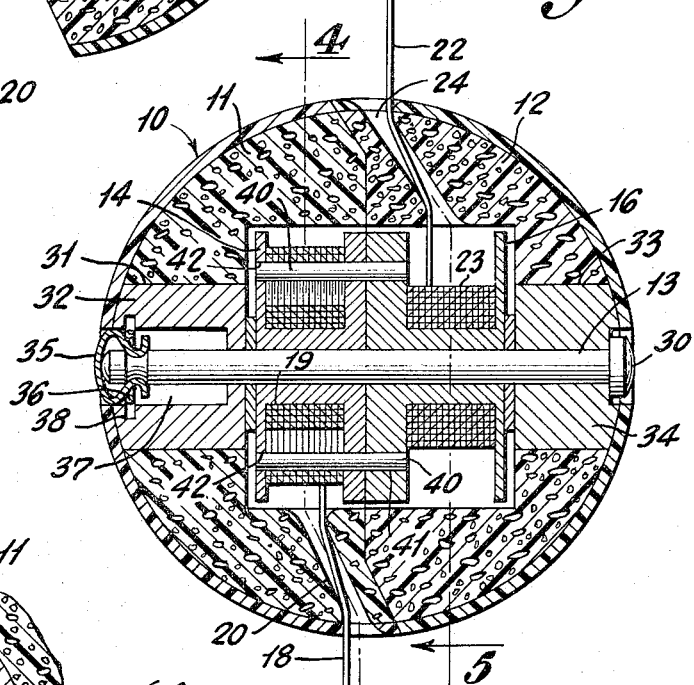
INVENTOR
Ervin E. Lintz
BY Stevens, Davis, Miller & Mosher
ATTORNEYS Sept. 12, 1967     E. E. LINTZ     3,340,644
FISHING FLOAT
Filed Sept. 27, 1965     2 Sheets-Sheet 2
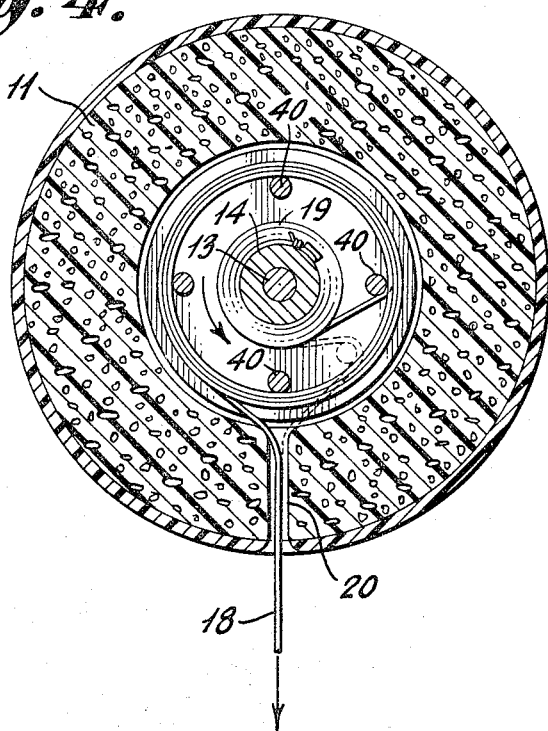
Fig. 4.
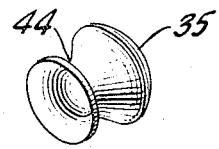
Fig. 6.
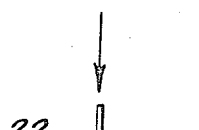
Fig. 5.
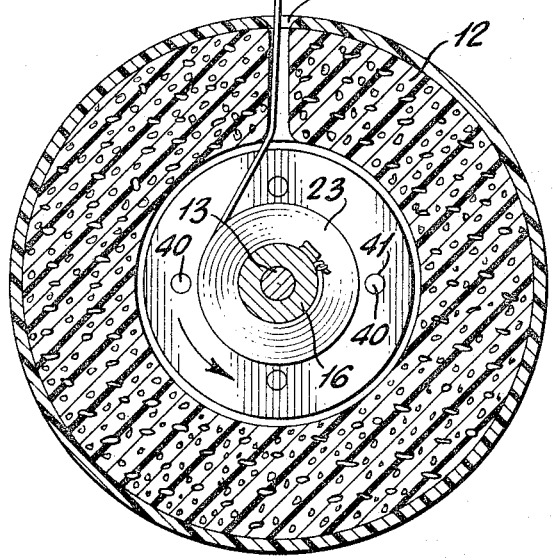
INVENTOR
Ervin E. Lintz
BY Stevens, Davis, Miller & Mosher
ATTORNEYS 3,340,644
FISHING FLOAT
Ervin E. Lintz, 1412 Martha NE.,
Albuquerque, N. Mex. 87112
Filed Sept. 27, 1965, Ser. No. 490,461
7 Claims. (Cl. 43—43.11)

This invention relates to a fishing float and more particularly to a fishing float having means for automatically controlling and regulating the amount of drop-line to be used.

In the fishing art, it is generally known to provide a type of float in which a buoyant member is provided with two spools which are rotatably mounted on a common shaft. Generally, a cast-line is wound on one of the spools and extends to the fishing reel and a drop-line is wound up on the other spool in an opposite direction from that of the cast-line, and is connected to the fish lure, weight or hook, etc. Due to the fact that the respective lines are wound in an opposite direction and that the spools are coupled together, these devices provide for the automatic control of the water depth to which the drop-line extends.

In the general operation of these known devices, the amount of drop-line corresponding to the desired fishing depth is initially wound on the drop-line spool and at least a corresponding amount is wound from the fishing reel on the cast-line spool. When the float is cast into the water, the drop-line spool is rotated, usually due to the weight of the fish lure, and all of the drop-line winds off, locating the fishing line at the desired depth.

In the meantime, the cast-line spool, which is coupled to the drop-line spool, is rotating and a like amount of cast-line from the fishing reel is wound up on to the cast-line spool. When the fisherman is through fishing, he winds up his reel, which in turn rotates two spools, causing the cast-line to wind off of the cast-line spool and the drop-line to wind on the drop-line spool.

It is also generally known to provide only one line for effecting the above operation, this line usually passing from one spool through a notch or the like to the other spool. However, the same principles as above apply.

It is apparent, in these devices, that there is no way in which the fisherman may change the depth to which the drop-line extends, this depth being exclusively determined by the amount of drop-line wound on its spool. Therefore, more sophisticated known devices have attempted to solve this acute problem by utilizing notches, pins or the like, in conjunction with the drop-line spool. In general use of these devices, a relatively large amount of drop-line is initially wound on the drop-line spool and the exact amount desired is then wound over the pin and hub, or in the notch, etc. When the float is cast, only the latter amount of drop-line pays out from the spool. However, these devices are bulky in size, complicated to operate and difficult to manufacture. Also the fisherman must completely disassemble them in order to regulate the amount of drop-line to be used, which expends a great deal of time and patience.

Applicant has evolved and produced a fishing float which permits the automatic control of the amount of drop-line used and which overcomes the above-mentioned difficulties by providing for means to easily and quickly regulate the amount of drop-line.

Briefly summarized, the present invention involves the use of a fishing float in which at least two spools are rotatably mounted on a shaft carried by the float. The float consists of two sections, one fixed and one movable with respect to the shaft, each section having a spool associated therewith. The fishing line, which may consist of one continuous line or two separate lines, is wound on the spools in opposite directions, and one portion thereof extends to the fishing reel and another portion carries the fish lure, hook, weight or the like. One or more pins are provided so that, when the movable section and associated spool are moved into an abutting relationship with the fixed section and spool, after the desired amount of drop-line has been paid out, they extend across and parallel to a hub of one of the spools in order that they may receive the drop-line upon the subsequent winding in thereof. Upon each succeeding cast, this amount of line is wound off of the pins into the water to the proper depth.

Also in the present invention, the slidable section is provided with a recess in which the shaft extends. A snap-cap is mounted on the end of the shaft in the recess to prevent the slidable section from sliding off the end of the shaft. Also located in this recess is a snap-ring which is adapted to engage a groove in the snap-cap to fix the sections and spools in the above-mentioned abutting relationship. When the fisherman desires to change the amount of drop-line to be used, he merely has to exert a small amount of pressure against the snap-cap in a direction towards the fixed section thereby disengaging the snap-ring from the snap-cap groove, pull the sections apart, unwind the desired amount of line from the hub of the proper spool, and force the sections together again.

It is thus seen that the present invention permits the automatic control of the amount of drop-line to be used, plus the regulation of this amount in an extremely simple and quick manner.

The objects and advantages of the present invention will be more apparent from the following description, reference being had to the accompanying drawings wherein preferred embodiments of the present invention are clearly shown:

FIGURE 1 is a vertical axial sectional view of the float of the present invention, shown in its inoperative or open position;

FIGURE 2 is a vertical axial sectional view of the float of the present invention in its operative or closed position;

FIGURE 3 is a transverse sectional view taken along the line 3—3 of FIGURE 1;

FIGURE 4 is a transverse sectional view taken along the line 4—4 of FIGURE 2;

FIGURE 5 is a transverse sectional view taken along the line 5—5 of FIGURE 2, and FIGURE 6 is an enlarged perspective view of the snap-cap member.

Referring now in greater detail to FIGURE 1, which depicts the float of the present invention in its inoperative or open position, the numeral 10 in general represents the float which is formed by two buoyant sections, 11 and 12. A shaft 13 extends through each of the said sections and is fixed with respect to the right section 12. The left section 11 is slidable with respect to the shaft member 13 and when it is slid from the position shown in FIGURE 1 into contact with right section 12, a spherical shaped hollow buoyant float 10 is formed, as seen in FIGURE 2. Each of said sections 11 and 12 have an open or hollow portion in which is respectively disposed spools 14 and 16. Drop-line spool 14 is rotatably mounted on shaft 13, is located in the hollow portion of the left section 11 and slides along with section 11 to a point adjacent the cast-line spool 16. The latter spool 16 is likewise rotatably mounted on shaft 13 and extends in the hollow portion of right section 12, being fixed therewith relative to shaft 13. Drop-line 18 is wound upon drop-line spool 14 and extends outwardly through passage 20, the accumulated drop-line being shown generally at 19. Weight 26, hook 28, or any type of fish lure is connected to the end of drop-line 18. Similarly, cast-line 22 is wound upon cast-line spool 16 in an opposite direction to that of the drop-line and extends outwardly through passage 24 to the fisherman's reel, or the like (not shown). The accumulated cast-line is depicted at 23.

Each of the left and right sections 11 and 12 has a recess 31 and 33, respectively, in which is respectively located a bearing member 32 and 34. The right section 12 is fixed to shaft 13 by a head portion 30 located in a recess in bearing member 34. Bearing member 32 has a recess 37 into which the other end of shaft 13 extends, snap-cap 35 being fitted thereover. Bearing member 32 also has an inwardly disposed annular notch 38 formed therein which houses a generally elliptical snap-ring 36, the latter being adapted to engage a groove 44 provided in snap-cap 35. This arrangement can more readily be seen from FIGURE 3 and will be explained in greater detail below.

It may be ascertained from FIGURES 1 and 2 that when the left section 11 of float 10 is in an open position, or separated from right section 12, snap-cap 35 abuts the inner end wall 39 of the bearing member 32, thus preventing section 11 from sliding off the end of the shaft. Further, when section 11 along with spool 14 is moved to the operative or closed position as seen in FIGURE 2, snap-ring 36 engages groove 44 in snap-cap 35 to retain section 11 in the closed or operative position. To move section 11 from the closed position to the open position, one merely has to exert pressure upon the snap-cap head in a direction toward the fixed section 12, which will cause section 11 and spool 14 to move into the position shown in FIGURE 1. Conversely, to move section 11 and spool 14 from the open position to the closed position requires only that the sections 11 and 12 be pushed together until snap-ring 36 engages the groove 44. FIGURE 6 best illustrates snap-cap 35 and clearly shows the annular groove 44 into which snap-ring 36 engages.

Pins 40 are provided, which rotatably couple spools 14 and 16 together. Each of pins 40 has one end secured in the left rim of spool 16, as best shown in FIGURES 1 and 2. The right rim of spool 14 is provided with holes 41 in which the other end of pins 40 may slide as the left section 11 and spool 14 are moved from the open position of FIGURE 1 to the closed position of FIGURE 2. As seen from FIGURE 1, pins 40 only extend into receptacles 41 while, in FIGURE 2, they extend across and parallel to the hub of spool 16. In the latter position their ends engage in holes 42 provided in the left rim of spool 16.

The overall operation of the device is as follows: with section 11 and spool 14 in the inoperative, open position of FIGURE 1, a predetermined amount of drop-line 18 and cast-line 22 is respectively wound upon spools 14 and 16, this amount being greater than the desired fishing depth. The exact amount of drop-line to be used, corresponding to the desired fishing depth, is then unwound from spool 14. This, in turn, causes spool 16 to rotate due to the coupling between the spools provided by pins 40, a similar amount of cast-line 22 from the fishing reel thus being wound on spool 16. When the desired amount of drop-line is unwound from spool 14, the rotation is stopped by the fisherman and the two sections 11 and 12 are pushed together until snap-ring 36 engages groove 44 of snap-cap 35.

At this point, the spools are in their operative position with pins 40 extending across and parallel to the hub of spool 14, as shown in FIGURE 2. When a fish is caught or it is desired to recast, the fisherman merely reels in the cast-line off of spool 16, causing a rotation of it, and of spool 14, which, in turn, causes drop-line 18 to be wound around pins 40 instead of the hub of spool 14. This is continued until the float is at a point adjacent to the rod tip, with the weight, hook or the like immediately adjacent to the float. The arrangement of drop-line 18 at this point is better shown in FIGURE 4, the portion corresponding to the previous fishing depth being wound around pins 40, and the remaining portion around spool 14. It will be noted from a reference to FIGURE 5 that at all times cast-line 22 is wound to and from the hub of spool 16. When another cast is made and the float hits the water, the weight, hook, lure or the like sinks towards the bottom of the body of water due to its own weight, causing the spool 14 to rotate, which allows the drop-line 18 to be wound off of pins 40. In the meantime, cast-line 22 is being wound from the fishing reel upon spool 16. As soon as the pre-determined amount of drop-line 18 has been wound off of pins 40, the arrangement will be as shown by the dotted lines in FIGURE 4; that is, one of pins 40 will co-act with line 18 to cause the rotation of the spool to cease. The weight, hook or lure will then be at the pre-determined fishing depth. The casting may be repeated indefinitely with the assurance that this depth will be obtained with every cast.

When it is desired to regulate this pre-determined depth or the amount of line, the fisherman simply has to pull apart the two sections 11 and 12 by exerting a small pressure against snap-cap 35 in a direction towards fixed section 12, reel off the amount of line desired from hub 14, and force the two sections back together. This places the pins in position to receive this amount of drop-line upon subsequent rotation of the spools.

It is thus seen that the device of the present invention has several advantages, some of which are as follows:

(1) The spool arrangement may be inserted entirely within the buoyant member and out of contact with the water;

(2) The device is relatively simple and may be easily manufactured;

(3) The amount of drop-line may be regulated very easily by simply hand-forcing the two sections apart, unwinding the amount of line from the hub of spool 14 and pushing the two sections together again.

There has been illustrated and described what is considered to be the preferred embodiments of the fishing bobber. It will be understood, however, that various modifications may be made without departing from the broader scope of the invention as described by the following claims.

What is claimed is:

1. A fishing float to be used with a fishing line to automatically control the water depth to which the drop-line portion extends, said float comprising a buoyant member having a plurality of sections; a shaft carried by said buoyant member; a spool disposed in each section and rotatably mounted on said shaft, one section and associated spool being fixed with respect to one end of said shaft and another section and associated spool being slidable on said shaft from an inoperative position near the other end of said shaft to an operative position in which the respective spools and sections abut each other, one of said spools being adapted to receive said drop-line portion, means to limit the amount of drop-line portion which may be unwound from the drop-line receiving spool when the spools are in the operative position, said means also coupling said spools together, the slidable section having a recess in which the other end of said shaft extends; retaining means disposed on said other end of said shaft in said recess for retaining said slidable section and slidable spool in said inoperative position; and means in said buoyant member fixing said slidable section in said operative position.

2. The float of claim 1 wherein said retaining means comprises a grooved snap-cap.

3. The float of claim 2 wherein said fixing means comprises a snap-ring disposed in said recess and engageable with said snap-cap groove upon movement of said slidable section and slidable spool to the operative position.

4. The float of claim 3, including bearing means in said buoyant member having a recess in which said retaining means moves and a notch in which said snap-ring is disposed.

5. The float of claim 1 wherein said limiting and coupling means comprises at least one pin mounted on said fixed spool and engaging said slidable spool.

6. The float of claim 5 wherein said pin extends across and parallel to the hub of the slidable spool on movement of the latter to the operative position.

7. The float of claim 1 wherein said drop-line portion is disposed on said slidable spool.

References Cited

UNITED STATES PATENTS

| | | | |
|---|---|---|---|
| 2,190,113 | 2/1940 | Chreitzberg | 43—43.11 |
| 3,141,256 | 7/1964 | McBriar | 43—43.11 |
| 3,169,339 | 2/1965 | Ekstrand | 43—43.11 |

SAMUEL KOREN, *Primary Examiner.*

D. J. LEACH, *Assistant Examiner.*